United States Patent
Green et al.

(10) Patent No.: US 9,497,447 B2
(45) Date of Patent: Nov. 15, 2016

(54) SYSTEM AND METHOD FOR COLOR AND INTENSITY CALIBRATING OF A DISPLAY SYSTEM FOR PRACTICAL USAGE

(75) Inventors: Paul E. Green, Montreal (CA); Rajeev J. Surati, Cambridge, MA (US); Kevin Amaratunga, Belmont, MA (US); Samson J. Timoner, Cambridge, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 204 days.

(21) Appl. No.: 13/523,852

(22) Filed: Jun. 14, 2012

(65) Prior Publication Data
US 2012/0320042 A1    Dec. 20, 2012

Related U.S. Application Data

(60) Provisional application No. 61/497,094, filed on Jun. 15, 2011.

(51) Int. Cl.
*H04N 9/31* (2006.01)
*H04N 13/04* (2006.01)
*G01J 3/50* (2006.01)

(52) U.S. Cl.
CPC ........... *H04N 13/0459* (2013.01); *G01J 3/506* (2013.01); *H04N 9/3147* (2013.01); *H04N 9/3182* (2013.01); *H04N 9/3194* (2013.01); *H04N 13/0425* (2013.01)

(58) Field of Classification Search
CPC .................................................... H04N 9/3194
USPC ......................................................... 345/589
See application file for complete search history.

(56) References Cited

U.S. PATENT DOCUMENTS

| | | | |
|---|---|---|---|
| 6,025,929 A * | 2/2000 | Nakajima et al. | 358/1.9 |
| 6,173,070 B1 * | 1/2001 | Michael | G06K 9/00201 382/145 |
| 6,520,647 B2 | 2/2003 | Raskar | |
| 6,527,395 B1 | 3/2003 | Raskar et al. | |
| 6,677,956 B2 | 1/2004 | Raskar et al. | |

(Continued)

FOREIGN PATENT DOCUMENTS

| | | |
|---|---|---|
| CN | 100511124 C | 7/2009 |
| JP | 2010521705 A | 6/2010 |

(Continued)

*Primary Examiner* — Ryan D McCulley
(74) *Attorney, Agent, or Firm* — Loginov & Associates, PLLC; William A. Loginov

(57) ABSTRACT

The invention provides a system and method that allows for the calibration of color and intensity in a display system in a manner that is practical for the user, and handling obscuring factors, giving the user the ability to make intelligent trade-offs, and making it possible to quickly and efficiently re-compute a correction. More generally, correction and adjustment of intensity and color non-uniformities, and using optical sensor feedback to detect and correct for those changes is contemplated. This includes, but is not limited to, showing very bright images and very dark images. This invention further provides methods for making a practical system for the user, including a method of calculating corrections, dealing with obscuring factors that can affect the calculation process, providing information to allow users to make decisions on how to make trade-offs on the quality factors of the display, and allowing fast re-calculation of intensity corrections when re-calibrating.

7 Claims, 6 Drawing Sheets

(56) References Cited

U.S. PATENT DOCUMENTS

| | | |
|---|---|---|
| 6,709,116 B1 | 3/2004 | Raskar et al. |
| 6,715,888 B1 | 4/2004 | Raskar et al. |
| 6,729,733 B1 | 5/2004 | Raskar et al. |
| 6,733,138 B2 | 5/2004 | Raskar |
| 6,755,537 B1 | 6/2004 | Raskar et al. |
| 6,764,185 B1 | 7/2004 | Beardsley et al. |
| 6,781,591 B2 | 8/2004 | Raskar |
| 6,793,350 B1 | 9/2004 | Raskar et al. |
| 6,811,264 B2 | 11/2004 | Raskar et al. |
| 6,834,965 B2 | 12/2004 | Raskar et al. |
| 7,001,023 B2 | 2/2006 | Lee et al. |
| 7,038,727 B2 | 5/2006 | Majumder et al. |
| 7,131,733 B2 | 11/2006 | Shibano |
| 7,137,707 B2 | 11/2006 | Beardsley et al. |
| 7,154,395 B2 | 12/2006 | Raskar et al. |
| 7,242,818 B2 | 7/2007 | Beardsley et al. |
| 7,252,387 B2 | 8/2007 | Raskar et al. |
| 7,292,269 B2 | 11/2007 | Raskar et al. |
| 7,355,583 B2 | 4/2008 | Beardsley et al. |
| 7,421,111 B2 | 9/2008 | Dietz et al. |
| 2003/0128337 A1* | 7/2003 | Jaynes et al. ............... 353/30 |
| 2004/0085477 A1* | 5/2004 | Majumder ............... H04N 9/12 348/383 |
| 2004/0218828 A1* | 11/2004 | Aiso ............................ 382/254 |
| 2005/0078227 A1* | 4/2005 | Kobayashi et al. .......... 348/745 |
| 2007/0036456 A1* | 2/2007 | Hooper ....................... 382/274 |
| 2008/0246781 A1* | 10/2008 | Surati et al. ................ 345/690 |
| 2010/0321382 A1 | 12/2010 | Amaratunga et al. |
| 2011/0176007 A1* | 7/2011 | Ding et al. .................. 348/189 |

FOREIGN PATENT DOCUMENTS

| | | |
|---|---|---|
| WO | WO 2008115464 A1 | 9/2008 |
| WO | 2010148303 A2 | 12/2010 |

\* cited by examiner

SYSTEM AND METHOD FOR COLOR AND INTENSITY CALIBRATING OF A DISPLAY SYSTEM FOR PRACTICAL USAGE

RELATED APPLICATION

This application claims the benefit of U.S. Provisional Application Ser. No. 61/497,094, filed Jun. 15, 2011, entitled SYSTEM AND METHOD FOR COLOR AND INTENSITY CALIBRATING A DISPLAY SYSTEM IN THE PRESENCE OF CONFUSING FACTORS, the entire disclosure of which is herein incorporated by reference.

FIELD OF THE INVENTION

This invention is related to displays, and focused on, but not exclusive to, multi-projection display systems. More particularly, this invention relates to systems and methods for adjusting displays to achieve more uniform color and intensity.

BACKGROUND OF THE INVENTION

People love to see imagery all around them. Size, brightness, resolution, contrast ratio, 3D and many other features attract the attention of viewers. The goal in creating a display system is to create the best experience possible for the viewer. Creating the best experience often means optimizing the quality of the display. Quality factors include, but are not limited to, geometric accuracy, color accuracy, contrast, resolution, and freedom from distracting artifacts and other performance properties which contribute to the generally pleasing nature of the image. They may also include allowing the displayed digital image to accurately represent the original digital image or an image found in nature. To achieve the best possibly experience for the user, and/or quality of the display, it is desirable to correct for certain inaccuracies in the image produced by a display by applying corrective measures to image information and tuning the operating point of the display system.

Display systems are composed of one or more display units. Display units may be flat panel displays, projectors, emissive displays, e-ink displays, etc. They may be flat or curved. Examples of such displays are listed in U.S. patent application Ser. No. 12/049,267 entitled SYSTEM AND METHOD FOR PROVIDING IMPROVED DISPLAY QUALITY BY DISPLAY ADJUSTMENT AND IMAGE PROCESSING USING OPTICAL FEEDBACK, and U.S. patent application Ser. No. 12/818,102, entitled SYSTEM AND METHOD FOR INJECTION OF MAPPING FUNCTIONS whose disclosures are incorporated herein by reference as useful background information. Disadvantageously, each of these types of display units may suffer from different artifacts.

Flat panel type displays, for example, often suffer from color and intensity sheen within panels, and color and intensity differences across panels. They may also suffer from different input-output curves. For example, they might show the low intensity gray levels very similarly, but not high intensity gray levels. Undesirable geometric issues may also result due to bezels, misalignment of multiple-panels, desiring unusual display shapes within a panel, panels being aligned in shapes such as a cylinder, etc.

Projection-based displays suffer from geometric distortions, sometimes on a per-color channel, often as a result of imperfect optics in the projectors. They also suffer from intensity variations within and across projectors, color sheens, color mismatches across projectors, varying black levels, different input-output curves, etc., For the display of 3D images, often a different/discrete image is presented to the right eye and the left eye. Methods for accomplishing this task can include using time to alternate images delivered to each eye, using properties of the light such as polarization or wavelength to select which eye will receive a particular image, using optics to attempt to deliver a different image to each eye based on the eye's spatial location, etc. For 3D images, as with standard images, there may be geometric artifacts, color and intensity artifacts, and potentially different artifacts for the image intended for each eye.

Corrections made to the system can occur in many places in the chain of functions that carry out the displaying of the image. One example can occur in the creation of the digital signal, such as described in detail in the above-incorporated SYSTEM AND METHOD FOR INJECTION OF MAPPING FUNCTIONS. One example can be described in the projector or intermediate warping boxes, such as the OMTE parameters, such as described in detail in the above-incorporated U.S. patent application Ser. No. 12/049,267. For example, in some projectors it is contemplated to change the input/output curve of the projectors, for example for each color independently. By way of example, some display units have shading tables across the projectors that can be accessible to be changes. Often Liquid Crystal on Silicon (LCOS) projectors include this capability.

The types of corrections that are contemplated include warping imagery onto the screen. If using projectors, blending imagery across projectors so that the total intensity of a region overlapped by multiple projectors is similar intensity to the rest of the display. It is also contemplated that corrections for color and intensity changes can occur both across display units and within display units.

Many types of imagery can be shown on the scene. Sometimes the content is effectively a rectangular image that can be blended and warped onto the screen. Sometimes the content consists of many views of a three dimensional scene, where potentially each display unit may be given a different view of a three dimensional scene, and each display units stretches and warps the views so that the resulting display system appears to show one very large view of the entire system. In this case, the content is often rendered using a three-dimensional rendering engine such as OpenGL or DirectX.

Some more specific considerations in view of identified disadvantages of the prior art are provided as follows, by way of useful background:

OBSCURING FACTORS: Display systems in use often have dirt or other foreign matter on the screen. Optical sensors, such as cameras, often have dirt or other foreign matter on their lenses. There can be non-functional pixels on the display system, and non-functional pixels on cameras. For many display systems, turning the lights off in a room or closing the drapes on the windows to make the room dark is challenging. Thus, color data and intensity data collected during the calibration is often noisy, or is prone to small errors giving the obscuring factors. There can also be shiny metal frames or black borders around the desired region of interest so that pixels on the boundary can appear to be much brighter or dimmer than is appropriate. Cameras sensors are not perfectly characterized. It is desirable to provide appropriate algorithms and processes that had handle these obscuring factors and still produce a high quality display system.

CALCULATING: Brilliant color is an algorithm/process often used in display units such that input intensities sent to a display unit are non-linearly mapped to output color and intensity. The goal is often to make images appear brighter. Such mapping algorithms/processes are sufficiently non-linear that mapping out the entire input to output color and intensity mapping curve requires a significant amount of data, which can be time-consuming. Similarly, light reflecting from one portion of the screen to another is challenging to model; but without taking such effects into account makes it difficult to generate uniform intensity displays. It is desirable to provide an algorithm that accounts for all of these issues.

USER TRADE-OFFS: Display units often have intensity fall-offs at or near the edges. When this happens, finding an overall display system with uniform intensity can mean giving up a lot of brightness. Therefore, users typically prefer systems that are perceptually uniform, such as described in U.S. Pat. No. 7,038,727, entitled METHOD TO SMOOTH PHOTOMETRIC VARIATIONS ACROSS MULTI-PROJECTOR DISPLAYS" by Majumder et al., the teachings of which are incorporated by reference as useful background information. It is noted that slow intensity and color variations across a system are often not perceivable by humans. Allowing such variations rather than requiring uniform intensity typically results in a significantly brighter display.

In actual, commercially available display and imaging systems, users prefer to make trade-offs and understand the effects of their decisions. For example, in very bright rooms, users may choose the brightest display system possible, irrespective of the resulting uniformity (or lack thereof) of the display system. In very dark rooms, perceptual intensity smoothness can be far more significant. In other situations, users may prefer to make a trade-off between brightness and perceptual uniformity.

Similarly, users may often trade off speed of the calibration or calculation process for the accuracy of the results. Alternatively, users may often trade off brightness for color variations. Sometimes users have spatial preferences. For example, the region at the center of display system may need to be very uniform, but the need for uniformity in other regions of the system may be of less concern.

FAST RECALCULATION: As a system sits, the optical sensors or the display units can often move small amounts by being shaken or nudged. Collecting color and intensity data about the projectors from the optical sensors can be a time-consuming process—particularly because of the common desire to calibrate a system for both bright content and dark content, meaning that many training images may need to be captured to achieve a good display result during runtime. It is desirable for the system to be able to use previously collected data, and re-use it with a minimum amount of new data collection.

Thus, it is generally desirable to provide a calibration system for color and intensity that is practical for the user to handle and operate, handling obscuring factors, allowing the user to make trade-offs, and making it possible to recalculate a correction quickly and efficiently.

SUMMARY OF THE INVENTION

This invention overcomes disadvantages of the prior art by providing a system and method that allows for the calibration of color and intensity in a display system in a manner that is practical for the user, and handling obscuring factors, giving the user the ability to make intelligent trade-offs, and making it possible to quickly and efficiently re-compute a correction. More generally, this invention contemplates correction and adjustment of intensity and color non-uniformities, and using optical sensor feedback to detect and correct for those changes. This includes, but is not limited to, showing very bright images and very dark images. This invention further provides methods for making a system that is practical for the user. These methods include: a method of calculating the corrections, dealing with obscuring factors that can affect the calculation process, providing information to allow users to make decisions on how to make trade-offs on the quality factors of the display, and allowing fast re-calculation of intensity corrections when re-calibrating.

In an illustrative embodiment, a system and method for calibrating spatial intensity and/or color variations in one or more unit displays of a system using one or more light sensors comprises the steps of (a) calculating a target image using the display units, and (b) calculating a target image using the display units; and converging, with an iterative algorithm, at least one of spatial intensity and color variations to the target image, the iterative algorithm applying 1 or more iterations when a predetermined accuracy is unachieved (i.e. more generally, using zero (0) or more iterations). Illustratively, the step of converging is free of measuring an input to output curve of the projectors. Illustratively, the displays can be projectors and the system and method can further include a processor/process that modifies OMTE parameters and/or provides an injection function. Moreover, the system and method can further provide a stereo display with one image adapted to reach (be viewed by) each eye of a viewer. In further illustrative embodiments a system and method for calibrating the spatial intensity and/or color variations in one or more unit displays comprises (a) providing one or more light sensors, and (b) detecting obscuring factors and their affects by weighting one or more predetermined regions differently than other regions in the calculation of a desired target image of the display. These obscuring factors (which are detected) can include fixed pattern noise in the camera, dirt or contaminants on a camera lens or screen, or pixels on an edge of the display overlapping other screen sources.

In another embodiment a system and method for calibrating the spatial intensity and/or color variations in one or more unit displays comprises (a) providing one or more light sensors (b) providing a user interface that includes a selection option for a trade-off between a plurality of quality factors in a target image. The trade-off can be between intensity smoothness and brightness and can be set by employing providing a user-interface interface slider that allows the user to choose a trade-off operating point. Likewise, the trade-off can be between intensity smoothness and brightness and a plot is provided for a user to choose a trade-off operating point. More generally, the trade-off can be between brightness and color variations, computation time and quality of the converged result and/or quality of the system in one spatial region over another spatial region.

In yet another illustrative embodiment, a system and method for calibrating spatial intensity and/or color variations in one or more unit displays of a system using one or more light sensors comprises (a) calculating derivatives of measurements in the light sensors with respect to motion of the cameras and the movement of the light sensors, (b) estimating measurements of motion of the unit displays and movement in the light sensors, and (c) estimating, with the initial photometric calibration data before movement, the motion, and the derivatives, a new desired correction of the system. The light sensors can include one or more cameras and/or one or more projectors. The system and method can further include a processor/process for converging, with an iterative procedure, the spatial intensity and/or color variations to the target image.

BRIEF DESCRIPTION OF THE DRAWINGS

The invention description below refers to the accompanying drawings, of which.

DETAILED DESCRIPTION

Figure 1:
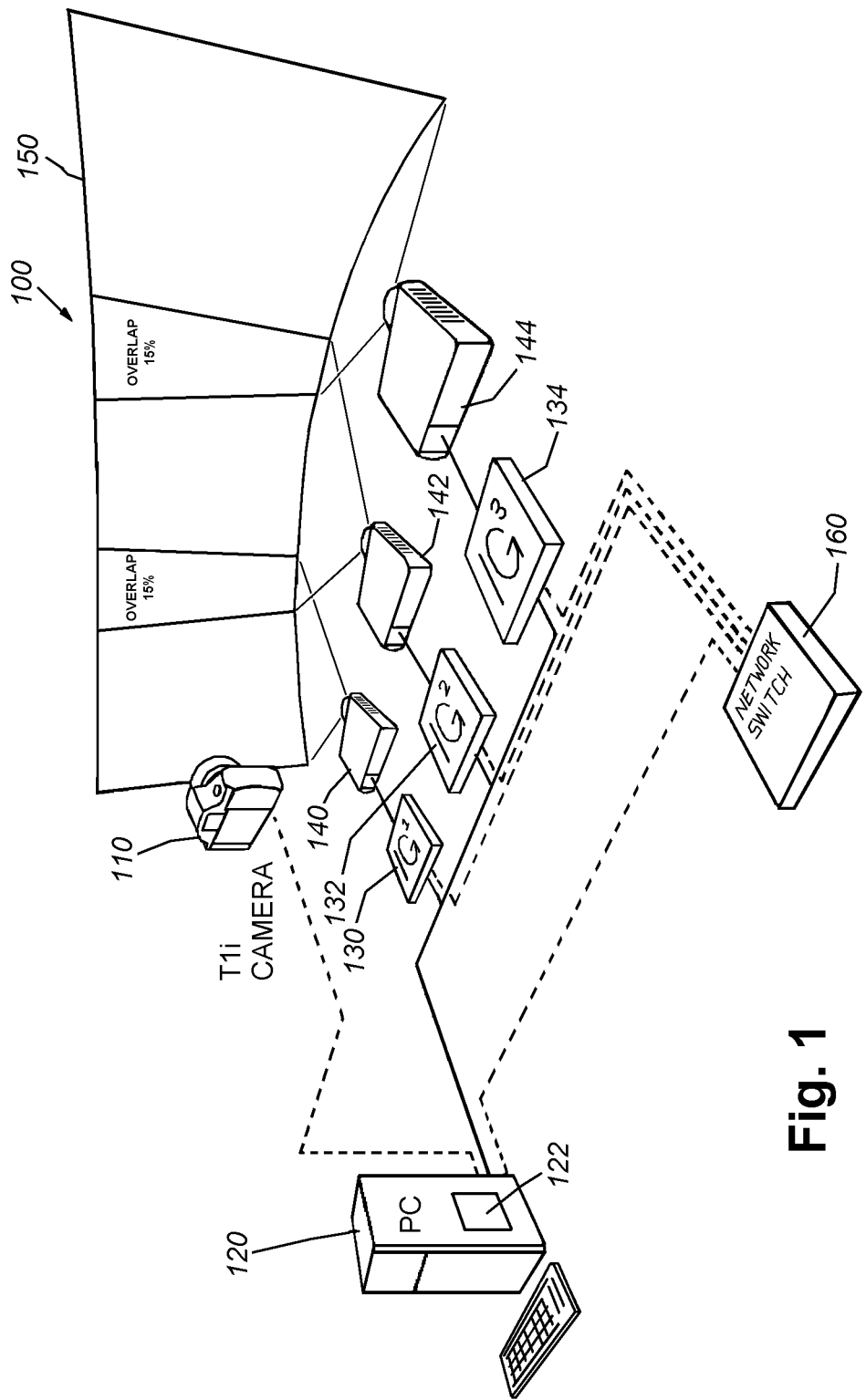
FIG. 1 is a diagram of a generalized, exemplary implementation of a display system with automatic calibration in accordance with an illustrative embodiment of this invention.

FIG. 1 is a block diagram of an exemplary display system 100 with automatic calibration in accordance with an illustrative embodiment. In this case a single camera sensor 110 is used to calibrate a three-projector system. The camera 110 can be a conventional unit (e.g. a digital SLR) or a custom arrangement, which is able to measure the geometric location, the color and intensity of the projectors across the system, and create a correction. The result correction can then be inserted into a correction produced in the exemplary PC 120 that includes a stored, non-transitory software application (and/or electronic hardware) (block 122) for operating the system and method herein, in an image generated to be sent to the image generators (IGs) (which can be conventional PCs) 130, 132, 134 which then relay the image to the projectors 140, 142, 144 (respectively). Or, the correction can be applied to the IG directly. Part of the color correction can be uploaded to the interconnected projectors 140, 142, 144 (respectively). The projectors 140, 142, 144 thereby project the combined image from the source(s) on a screen 150, typically with appropriate overlap (e.g. a 15% overlap as shown). In an illustrative embodiment, the interconnection between the projectors can be controlled by a network link (wired and/or wireless), which can include a conventional network switch 160.

Figure 2:
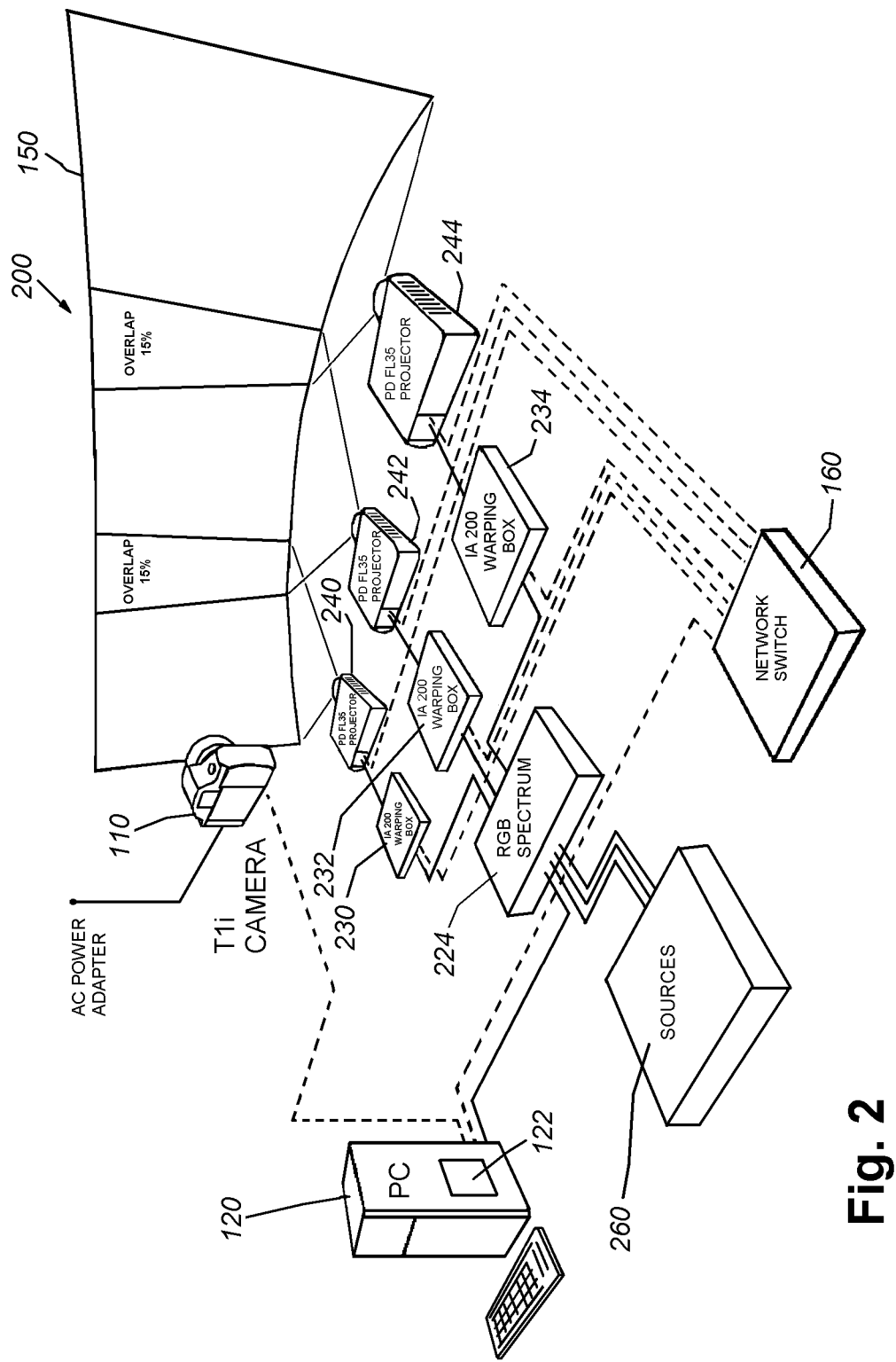
FIG. 2 is a diagram of a generalized exemplary display system with automatic calibration in accordance with an illustrative embodiment of this invention, in which the exemplary display system differs from that of FIG. 1 by including boxes to modify the video signal transferred to the projector.

FIG. 2 is a block diagram of an exemplary display system 200 with automatic calibration in accordance with a generalized embodiment of this invention. This embodiment is very similar to FIG. 1 (and like components are similarly numbered), except that there is also provided within the linked video feed an RGB spectrum box 224, which is a type of video wall controller. In this case, the distortion correction, color correction and intensity correction can be placed into the warping boxes (in the figure shown as IA 200 warping boxes 230, 232, 234, produced by Flexible Picture Systems, Inc of Ontario, Canada), or in combination in the warping boxes and in the projectors 240, 242, 244. The warping boxes 230, 232, 234 receive images from one or more sources 260 as shown and described above.

Figure 3:
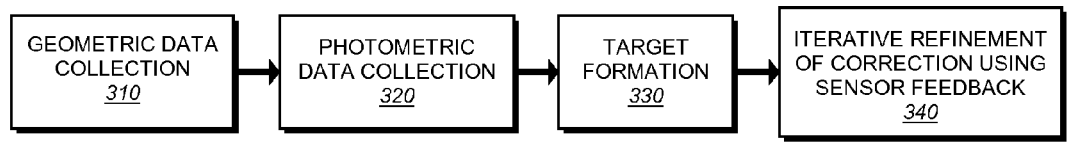
FIG. 3 is a flow diagram showing the steps of an illustrative process for finding a color and intensity correction.

FIG. 3 is an illustrative algorithm/process in use. The main steps are geometric data collection (step 310), photometric data collection (step 320), target formation (step 330) and iterative refinement of the solution using sensor feedback (step 340).

In the geometric mapping step (310), a map is formed between the display units and the optical sensors. Many algorithms/processes can be employed to perform this illustrative process. As an example, ScalableDesktop (software produced by Scalable Display Technologies of Cambridge, Mass.) puts up a sequence of spot patterns that are collected by one or more cameras to produce such a mapping. More generally, as used herein the term "algorithm" should be taken broadly to include all or part of a process/procedure carried out using a non-transitory computer-readable medium of program instructions. The system and method herein can be implemented using such a non-transitory computer-readable medium and/or electronic hardware, including purpose-built computing chips, such as FPGAs, ASICs and the like. Additionally, where a method step or process block is shown and described, it is expressly contemplated that all or part of that step/process can be implemented in another separate, discrete step or process. Likewise, various steps/processes (or portions thereof) can be functionally combined in ways different than those depicted.

The photometric collection phase (320) can illustratively begin by capturing a background image from one or more cameras, recording the ambient illumination and projector black levels. If a background image is captured it can be used to remove ambient and black level illumination from subsequently captured images using a variety of techniques, such as various subtraction techniques. In illustrative embodiments, the data collection phase continues by sequentially illuminating each projector, one at a time with a full intensity solid white (RGB=255) input image, while sending black (RGB=0) input to all remaining projectors and capturing images from one or more cameras. These collected images, termed bright images, may be low-pass filtered to remove noise and may have each RGB pixel scaled by a 3×3 white-balance matrix. Illustratively, this white-balance matrix can be diagonal.

The next phase of the process is Target formation (step 330). Without loss of generality, there are many mechanisms of computing a target image. One method of target formation illustratively begins by accumulating the bright images for each camera or sensor into a single image termed the maximum output image. An active region, which can be determined by a mask or other methods, is selected from the maximum output image. In various embodiments, the active region can be down-sampled to a lower resolution. The active region is unrolled into an N-dimensional vector M, with one dimension for each valid pixel in the active region of the camera. In one embodiment, the quadratic optimization for optimal Target t* is solved as follows:

$$t^* = \arg\min 0.5 * t^T * H * t - w1 * t$$

such that $0 <= t \leq M$ where $H = w2*(Dx^T*S1*Dx + Dy^T*S2*Dy) + w3*(Dxx^T*S3*Dxx + Dyy^T*S4*Dyy)$, and w1, w2, w3 are scalar weights and Dx and Dy are matrices which compute the spatial x and y first derivatives and Dxx and Dyy are matrices which compute x and y second derivatives, and $x^T$ and $y^T$ are x and y transpose. The S1, S2, S3, and S4 matrices are diagonal, and are effectively spatially varying weights that can vary based on region, and intensity, and the statistics of the histograms in the image intensity. Often, they are left as identity matrices. The constraint that the target image must be less than M effectively ensures that the target is achievable.

In a final step, the target T is computed by up-sampling t*, if necessary, to the original dimension of the maximum output image active area.

The above-described phase is illustratively repeated for each camera.

The final phase of the process is iterative refinement (340) of the solution using camera-based feedback. The solution is, without loss of generality, the R, G, B triples sent as input to the projectors in order to most closely achieve the target image.

As one illustrative embodiment of the iterative phase: Edge blending weights are computed in overlapping regions of the projectors and these blending weights are used as the initial point of the solution. At each step of the iterative phase, the current solution is displayed on all projectors, an image is captured from one or more cameras, and these images are compared to the target t*. The ratio of the current image C, (for example after low-pass filtering) and the target image t* is computed, and an update on the input to the projectors is calculated. Various iterative solvers can be used including downhill simplex. Note that the ratio from the current image C is typically computed per camera pixel, and per color. Note that zero (0) iterations is contemplated as a "number" of iterations if the model of the projectors and measuring system are well-described.

The iteration phase is terminated if a maximum number of iterations is reached or the difference, computed using a suitable error metric, falls below a prescribed threshold.

There are two notable advantages to this type of solution. First, this type of iteration can be completed without measuring the input output curves of the projectors. The end result is that many measurements need not be taken. The second is that in systems when secondary reflections are important, this type of method is able to compensate for it directly without making estimates of the refelectances in the system. For example, in dome systems, it is typical that 10% of the light from one portion of the screen comes from light that has reflected from other portions. So, the effects of light bouncing around can be very important. But, to model those bounces effectively means either taking a lot of measurements, or having very good models of the screen, projectors and cameras.

If the input output curve of the projector is available, or is estimated already, it may simply be included in the in the minimization, using it to aid in estimating optimal step sizes in the minimization. If it is not available, the minimization may take place without that information.

The process described in FIG. 3 can be done once, or repeated multiple times. For example, several target images can be formed, for example one at full intensity, one at half intensity, one at quarter intensity and one at three quarter intensity. Then the inputs sent to each projector can be determined for each target, thereby effectively determining a simple lookup table on projector intensities.

Display systems in use often have accumulated dirt or other contaminants on the screen. Likewise, optical sensors, such as cameras, often have dirt and/or contaminants on their lenses. This contamination one of many types of obscuring factors that, as described above, have an effect on the image appearance and characteristics, both locally in predetermined regions thereof and globally, across a substantial area of the image.

Figure 4A:
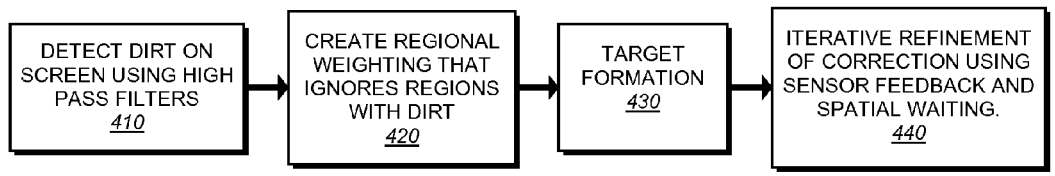
FIG. 4a is a flow diagram showing the steps of a procedure for correcting the obscuring factors of dirt on the display.

FIG. 4a shows a flow diagram of a process for dealing with (correcting for) obscuring factors when dirt/contaminants are present on the screen. Obscuring factors are those that lead applicable algorithms/processes to yield an undesirable color correction. Since the algorithms/processes in FIG. 3 often implicitly assume a smooth color correction, dirt/contaminants on the screen can create a localized intensity depression. Dirt/contaminants has/have the potential to cause a localized dip in intensity, or cause (trick) the system to believe that a lower overall brightness is achievable, since the pixels on the dirt/contaminants do the not appear as bright to the image sensor as pixels on the screen but off the dirt contaminants. Most often, users may prefer to choose to ignore the dirt/contaminants. Therefore, in FIG. 4, the first step is to provide an algorithm/process that locates possible dirt and/or contaminants (step 410), and create a spatial weighting term to ignore the dirt/contaminants (step 420). The target step (430) can be completed in a manner similar to that described for FIG. 3 above. The minimization for FIG. 3 is, therefore, modified to include a spatially varying weighting term, which is set to 1.0 for all regions in the image, except within the region containing the pixels that at least partially overlap the region of the dirt/contaminants. Such overlapping pixels are illustratively set to a value 0.0 (referenced in FIG. 4 as step 440). The values used for setting of weightings are illustrative only and a variety of other values can be used.

Dirt and/or contaminants on the screen can be located thereon in a variety of ways. In various embodiments, the intensity of the projector is expected to be slowly varying in the middle of the screen. Thus, a high-pass filter can be used to locate high-spatial frequencies in two directions, which is an effective technique for locating such dirt/contaminants.

Figure 4B:
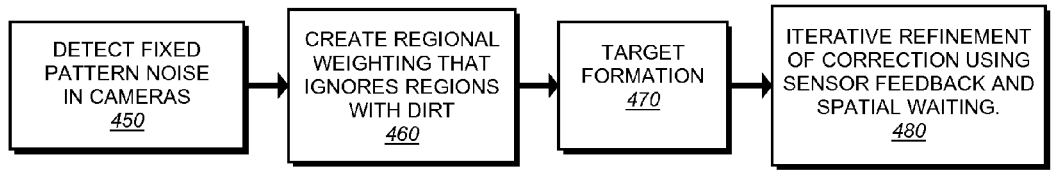
FIG. 4b is a flow diagram for handling of dirt and/or contaminants on the lens.

In FIG. 4b, a method is provided for handling another obscuring factor: dirt and/or contaminants on the lens. By way of example, in microscopy, where high-fidelity imaging is common, dirt/contaminants on the lens is/are often considered part of fixed pattern noise. That is, the gain of individual pixels is effectively different than the gain of other pixels because of the dirt/contaminants on the lens. Note that the effects of dirt/contaminants are often non-localized, and affect many camera pixels. Fixed pattern noise can be detected by acquiring image frames with a variety of exposure times of the same scene to detect the input/output curve of individual pixels (step 450). Camera pixels with very low gains, and therefore low sensitivity, can be weighted differently than camera pixels with very high gains. Similar to the process of FIG. 4a above, a spatially varying term can be added into the minimization for FIG. 3 (step 460). Steps 470 and 480 are substantially of precisely the same as those for 430 and 440.

For other obscuring factors, such as varying backgrounds, one or more improperly measured camera responses, an iterative algorithm/process can be used.

Figure 5A:
FIG. 5a and FIG. 5b are exemplary graphical user interface system allowing a user to make trade-offs in intensity smoothness and brightness according to an illustrative embodiment.
Figure 5B:
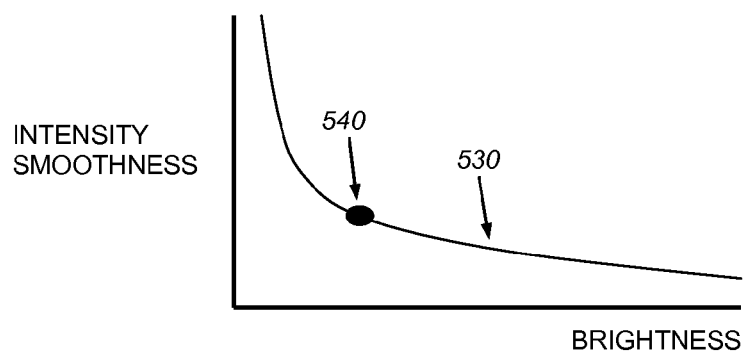

In FIG. 5a and FIG. 5b, two examples are shown which allow a user to make trade-offs between brightness and intensity smoothness.

Supplying the user with a user interface to choose between brightness and intensity smoothness is the most common trade-off. A user interface including a slider, to make the decision is useful (FIG. 5a). In this figure, a user can move a slider 520 along a line 510 and the weights shown and described for FIG. 3 can be changes to move heavily weighted intensity smoothness or brightness. In another embodiment, collected photometric data as described in FIG. 3 can be used to estimate the graph of intensity versus perceptual uniformity, and allowing the user to choose an operating point 540 on the graph 530 affords the user a very clear understanding of what tradeoffs he or she is making This, in turn, allows the user to choose operating points more quickly. Note that users may desire several operating points depending on the time of day or lighting in the MOM.

In any user-selected trade-off, providing a user-interface to make these decisions is desirable for use in a practical system. And, providing plots or sliders, or other appropriate user interface mechanisms to choose operating points is also useful. Likewise, providing the user with a tool to indicate regions of high importance can be useful.

Figure 6:
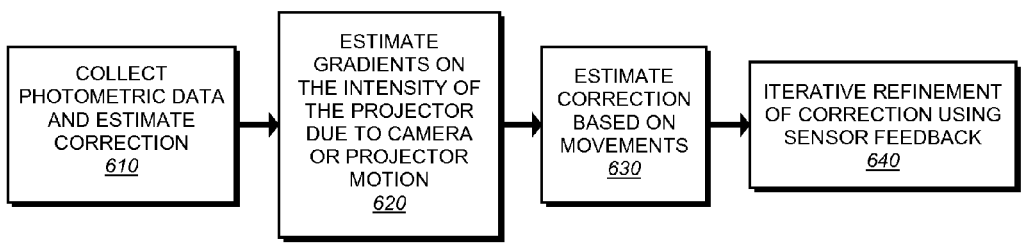
FIG. 6 is a block diagram of a procedure for providing efficient recalibration to the system.

FIG. 6 is a block diagram of a procedure for providing an efficient recalibration to a system. One illustrative procedure is to model the entire system, attempting to estimate the three-dimensional (3D) location of the projectors and cameras, the intensity fall-offs, the BRDF of the screen, etc. When cameras and projectors are moved from a prior position/orientation, the effects of all the associated motions can be added into the previously completed measurements, and an estimate of the minimization as described in FIG. 3 can be re-initiated with an excellent prediction of the final result.

Many illustrative embodiments exist that do not require estimating/measuring the BRDF. One example is the case when the motions of projectors and cameras are relatively small, as is common in a variety of exemplary implementations. In this case, one can estimate the effects of motion on color and intensity by estimating the gradients in intensity and color that are caused by small motion. In this case, a re-calibration would need to measure the new geometric position of the display units, but simply re-estimate the color and intensity correction that should be employed using the previously collected color and intensity data. Alternatively, for an iterative procedure, it can illustratively begin with a solution point relatively/very close to the desired solution, and become iterative from this point. As collecting data and performing the illustrative iterative procedure can be time-consuming, this illustrative procedure can provide a significant time advantage over re-collecting the data from scratch. In FIG. 6, the procedure initiates with step 610, which is equivalent to, or the same as, the minimization described in FIG. 3. The procedure then can estimate gradients of intensity due to motion (step 620). In basic estimate, which can be sufficient to provide needed data in practice, this is an understanding of how geometric motions lead to movement of the pixels on the screen and/or in the camera. In step 630, the procedure estimates corrections based on the movements and the gradients. Thus, the procedure is effectively ready to start a minimization similar (or identical) to the minimization described in FIG. 3 (step 640). However, in this case the procedure employs data based on the initial measurements, the estimates of motions, and the gradients.

Figure 7:
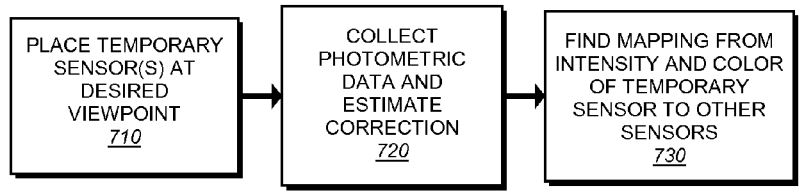
FIG. 7 is a block diagram of a procedure for providing color and intensity calibration from a viewing region using a temporary sensor.

Often the viewpoint of interest (i.e. the region from which viewers are place) is far from where a permanently mounted camera or other light sensor is located. Permanently mounted sensors are beneficial because it allows a user to re-calibrate the system when desired quickly, without moving equipment. In this case, having a model of the screen reflection parameters (or making estimates of them) can be used to calculate the intensity that is viewed at one or more different viewpoints than those of the sensors. Though, permanent sensors are often placed far from the desired viewpoints meaning that the transformation may need to be known very accurately to get a good result. FIG. 7 is a further embodiment of the system and method using a temporary sensor. In step 710, the temporary sensor is placed at or near the viewpoint. In step 720, the temporary sensor and the permanent sensors collect the same photometric data and use this data in estimating correction. In step 730, a potentially spatially varying mapping is formed from the temporary sensor to the permanent sensors. One example of an efficient mapping is a lookup table. In this way, color and intensity from the temporary sensor to the permanent sensors is effectively learned, allowing calculations of the desired target image (Step 330) free of the temporary sensor.

Figure 8:
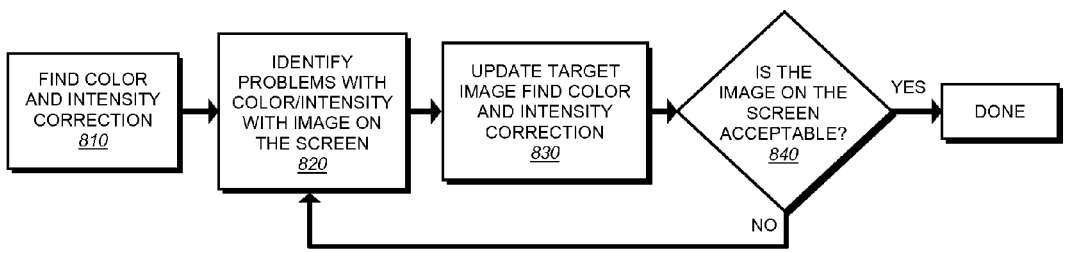
FIG. 8 is a block diagram of an alternative procedure for providing color and intensity calibration from a viewing region using feedback.

FIG. 8 is a block diagram of another embodiment of a procedure for providing color and intensity calibration from a viewing region using feedback, when the sensors are not in the desired viewing region. In step 810, a color and intensity correction is produced using, for example, the method steps generally shown and described with reference to FIG. 3. An image is then projected on the screen, such as a solid gray image. In step 820, a user or another (e.g. automated) method can indicate problems with the image on the screen, such as the image being too dark or too bright in a certain region. Alternatively, the user can indicate that a region's color is incorrect (e.g. appearing too red, too green, etc.). In step 830, using the information provided, the target image can be updated in the indicated region(s). Illustratively, a smoothness constraint can be used when updating the target image so that no sharp changes occur in the final image that appears on the screen. In step 840, the user or another method decides if the updated image on the screen is acceptable. If not acceptable according to predetermined parameters than can be fixed or user-set, then the process returns to step 820, and iterates. If not acceptable, the process completes.

Additional Embodiments

There are a variety of further embodiments based upon the generalized principles described herein.

There are a variety of obscuring factors that often can be addressed to provide an improved image. As described above, a significant obscuring factor is dirt/contaminants on the screen and/or camera lens. Likewise, the display system can include non-functional pixels on either a display screen or at least one of the cameras. By way of further example, various external structures, such as shiny (specular) metal frames or black borders around the desired region of interest can be present in the image field. In such examples, pixels on the boundary can appear to be much brighter or dimmer than is normally appropriate. Each of these obscuring factors can be detected by appropriate procedures, and their effects can be compensated. An illustrative procedure to address these factors is based upon the detectors used for them, and regional weighting algorithms/processes, such as described in FIGS. 4a and 4b.

For various display systems, the act of turning the lights off in a room or closing the window blinds/shades to darken the room, containing the display system presents certain challenges. Thus, color data and intensity data collected during the calibration is often noisy, or is prone to small errors based upon the various applicable obscuring factors present in the system. It is notable that camera sensors are not perfectly characterized. The goal then is to provide an algorithm/process that can handle or address these obscuring factors, and still provide a high-quality display system. Also, light bouncing from one surface of the screen to another can be quantitatively large, and its occurrence or quantity can be difficult to predict. Moreover, Brilliant™ color is an algorithm/process used on many DLP projectors (e.g. available from Texas Instruments Incorporated of Dallas, Tex.) that non-linearly mixes color for enhanced brightness, and can be extremely time-consuming to fully characterize. To address these factors, iterative algorithms can provide a very powerful solution. In systems of high-signal-to-noise ratios with good models of the system, iterative algorithms may not be necessary. In this case a number equal to zero (0) iterations can be used in step 340, or the procedure can simply converge very quickly because of the high-quality data. But, in most systems of interest, the accuracy of the models is insufficient, and one or more iterations are employed to provide desired accuracy. In general, the desired degree of accuracy can be based upon fixed, or user—defined/set parameters There are a variety of stereo systems that can be calibrated. Using a passive stereo system, there may be a projector intended to go to each eye using a mechanism such as polarization selection, with the user wearing glasses. Polarizers used with displays can often cause color shifts or intensity differences. To correct for these issues and others, it can be worthwhile to have two target images per camera or light sensor. In this case, because the projectors fill the same space, it is worthwhile to show black or otherwise disable one projector while changing parameters to move the other projector to the desired target. Similar methods can be used with other types of selection techniques such as color based stereo filters, and active shutter glasses, which are all generally known in the art.

There are many trade-offs that users may desire to make in setting up a display arrangement. Some of the trade-offs include speed of the calibration or calculation process for accuracy of the results. Alternatively, users will trade-off brightness for color variations. In some implementations, users have spatial preferences. For example, it can be desirable that the region at the center of display system be substantially uniform, while other regions can be less significant to the overall image. This regional importance metric can provide a parameter for use in the minimization procedure described in FIG. 3. These illustrative tradeoffs can provide a significantly improved image.

Note that the sensor could be one or more of a number of different types of sensors, including a plurality of differing types of sensors in a discrete system. One example would be a system that employs one or more fixed cameras. The sensor can be one or more cameras that can be moved as appropriate—for example a pan-tilt head arrangement. Illustratively, the sensor can be a light meter, such as a spectrophotometer, on a moving pan-tilt head, or a sequence of such meters. The illustrative light sensor can also consist of a multiplicity of photo-diodes, embedded in the screen.

In another illustrative embodiment, it is contemplated that the arrangement of FIG. 1 can include a plurality of (e.g. two) cameras rather than the depicted single camera. In an illustrative embodiment, one camera images the screen image created by the left and center projectors while the other (centered) camera images the center and right projector's images. In this case the target image for each camera formed following the process in FIG. 3 may not agree perfectly in the overlap region between the cameras. There are numerous methods to account for this challenge. One method is to use known edge-blending techniques that are commonly employed in the art. That is, the target for left side of the screen entirely originates from one camera, and the target for the right side of the screen entirely originates from the other camera, and the effective target image for the center of the screen originates from both cameras. In that commonly viewed/imaged region, the contribution on the left of that region is dominated by one camera, and then slowly transitions to be dominated by the other camera at the other end of the region that is viewed/imaged by both cameras. To accomplish this blending, the target images are typically transformed into a common coordinate system (e.g. one describing the screen), and then transferred back into each camera.

Often the viewpoint of interest (i.e. the region from which viewers are place) is not where a camera is located. In this case, having a model of the screen reflection parameters (or making estimates of them) can be used to calculate the intensity that is viewed at a different viewpoint than the camera. In other embodiments, a temporary sensor can be placed where the viewpoint is oriented to help the various illustrative procedures herein that employ light sensors to determine the identity/location of the correct target. This type of process (step 710) can be performed as a basic lookup table from the sensor in the region of the viewpoints, to the sensors in other locations. This process can also be performed by modeling the screen reflection parameters, and intensity fall-offs of projectors and cameras or other sensors, as well as other properties. The additional information can be used to refine that model. Also, illustratively, a temporary sensor can be positioned in each of a multiplicity of viewpoint locations can be desirable in refining the parameters of the model.

Alternatively, the user can similarly use a graphical user interface (GUI) on a display of a computer (e.g. a general purpose desktop computer, laptop, tablet or handheld device) to aid the methods and indicate what the identity and location of the correct target image. This type of procedure can be done as an iterative process. The user can select a region (e.g. using a mouse) and manually turn a slider on the GUI or elsewhere to cause it to become brighter or dimmer, or change the white point (e.g. to make it appear more red, etc.). This information can be fed back into an iterative method. Either the model of the system can be made more accurate (e.g. the reflection model of the screen, the fall-off in intensity of a projector, or the fall-off in collection efficiency of the camera), or it can be used non-parametrically, simply indicating a new target image in that region, and using smoothness constraints on the target image to extend the information over a larger region. Using a small number of indications from a user or other method, a good quality target image can be found across an entire system.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, where a human user can perform a step of a procedure, it is expressly contemplated than an appropriate automated device or mechanism, such as a machine vision system that acquires images of the screen and performs conventional, programmed vision system processes on the images, can be used interchangeably with the human user. In addition it is expressly contemplated that any of the procedures and functions described herein can be implemented in hardware, software, comprising a non-transitory and/or recordable computer-readable medium consisting of program instructions, or a combination of hardware and software. In addition, as used herein the term "process" can refer to one or more processes and/or processors that execute a function, method or procedure using hardware, software or a combination thereof. A process or processor can be implemented as a general-purpose computer or a purpose-built electronic circuit. Accordingly, this description is meant to be taken only by way of example, and not to otherwise limit the scope of this invention.

What is claimed is:

1. A method for correcting for obscuring factors on a screen comprising the steps of:
    detecting, using one or more image sensors, obscuring factors on a screen, wherein detecting the obscuring factors on the screen comprises using a high-pass filter to locate dirt or contaminants;
    creating a spatial weighting factor to ignore regions overlapping with the detected obscuring factors;
    creating a target image; and
    iteratively converging, using camera-based feedback, at least one of spatial intensity or color variations of a displayed image to the target image until a predetermined accuracy as measured by an error metric is achieved, wherein the error metric is defined in part based on a plurality of spatially varying weights and the spatial weighting factor.

2. The method as set forth in claim 1 further comprising converging, with an iterative algorithm, the spatial intensity or color variations to the target image using 0 or more iterations.

3. The method as set forth in claim 1 further comprising detecting dirt or contaminants on a screen containing the target image.

4. The method as set forth in claim 1 further comprising detecting dirt or contaminants on a camera lens or other fixed pattern noise on the camera.

5. The method as set forth in claim 1 further comprising detecting pixels on an edge of at least one of one or more display units overlapping other screen sources as obscuring factors.

6. A system for calibrating at least one of a spatial intensity and color variation in one or more display units comprising:
    one or more light sensors that detect obscuring factors on a screen wherein detecting the obscuring factors on the screen comprises using a high-pass filter to locate dirt or contaminants; and
    a processor that creates a spatial weighting factor to ignore regions overlapping with the detected obscuring factors, creates a target image, and iteratively converges, using camera-based feedback, at least one of spatial intensity and color variations of a displayed image to the target image until a predetermined accuracy as measured by an error metric is achieved, wherein the error metric is defined in part based on a plurality of spatially varying weights and the spatial weighting factor.

7. A non-transitory computer-readable medium storing instructions that, when executed by a computer, cause the computer to:
    detect, using one or more image sensors, obscuring factors on a screen, wherein detecting the obscuring factors on the screen comprises using a high-pass filter to locate dirt or contaminants;
    create a spatial weighting factor to ignore regions overlapping with the detected obscuring factors;
    create a target image; and
    iteratively converge, using camera-based feedback, at least one of spatial intensity and color variations of a displayed image to the target image until a predetermined accuracy as measured by an error metric is achieved, wherein the error metric is defined in part based on a plurality of spatially varying weights and the spatial weighting factor.

* * * * *